United States Patent [19]
Obata

[11] Patent Number: 5,280,568
[45] Date of Patent: Jan. 18, 1994

[54] METHOD AND APPARATUS FOR DRAWING A SURFACE MODEL BY ASSIGNING A DRAWING PRIORITY TO EACH PRIMITIVE SURFACE MODEL WHICH PROVIDES A PORTION OF THE SURFACE MODEL

[75] Inventor: Koei Obata, Kusatsu, Japan
[73] Assignee: Daikin Industries, Ltd., Japan
[21] Appl. No.: 565,482
[22] Filed: Aug. 10, 1990
[30] Foreign Application Priority Data
Aug. 10, 1989 [JP] Japan ............................. 1-207327
[51] Int. Cl.⁵ ............................... G06F 15/72
[52] U.S. Cl. ................................. 395/121; 395/122
[58] Field of Search ................. 395/121, 122, 135
[56] References Cited

U.S. PATENT DOCUMENTS

| | | | |
|---|---|---|---|
| 4,737,921 | 4/1988 | Goldwasser et al. | 395/121 |
| 4,791,582 | 12/1988 | Ueda et al. | 395/129 |
| 4,918,626 | 4/1990 | Watkins et al. | 395/121 |
| 4,924,414 | 5/1990 | Ueda | 395/122 |
| 4,935,879 | 6/1990 | Ueda | 395/130 |
| 4,945,495 | 7/1990 | Ueda | 395/130 |
| 4,958,300 | 9/1990 | Ueda | 395/129 |
| 4,970,636 | 11/1990 | Snodgrass et al. | 395/121 X |
| 5,072,413 | 12/1991 | Seki et al. | 395/127 |

*Primary Examiner*—Mark K. Zimmerman
*Attorney, Agent, or Firm*—Beveridge, DeGrandi, Weilacher & Young

[57] ABSTRACT

A method for drawing a surface model performs modelling for plural primitive surface models, each primitive surface model being a part of the surface model, and applies drawing priority to each primitive surface model. Then, the method draws the primitive surface model with hidden surface removal based on depth values when the primitive surface model has the same drawing priority as the drawing priority of another primitive surface model, and draws the primitive surface model without hidden surface removal when the primitive surface model has a higher drawing priority.

10 Claims, 19 Drawing Sheets

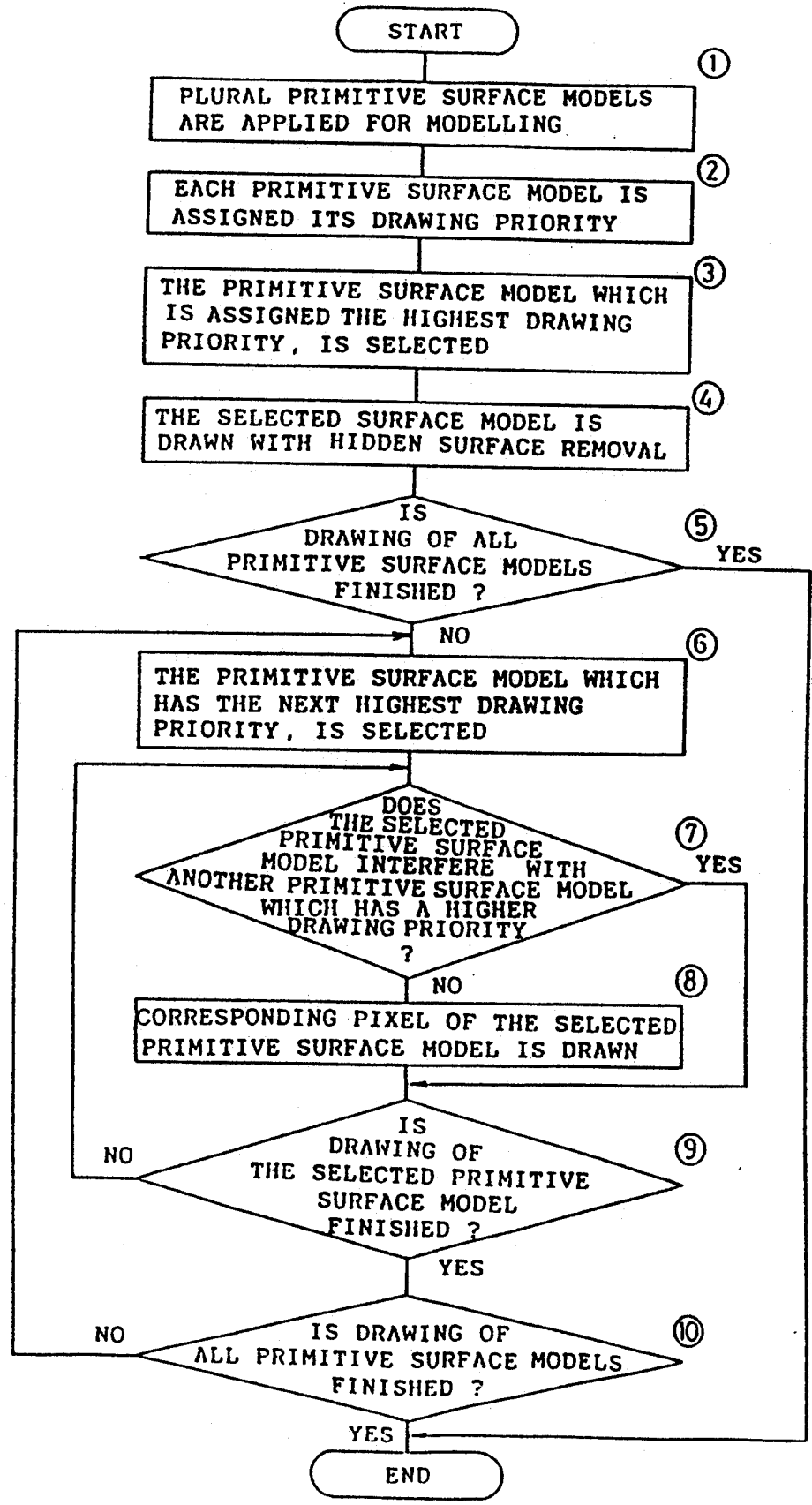

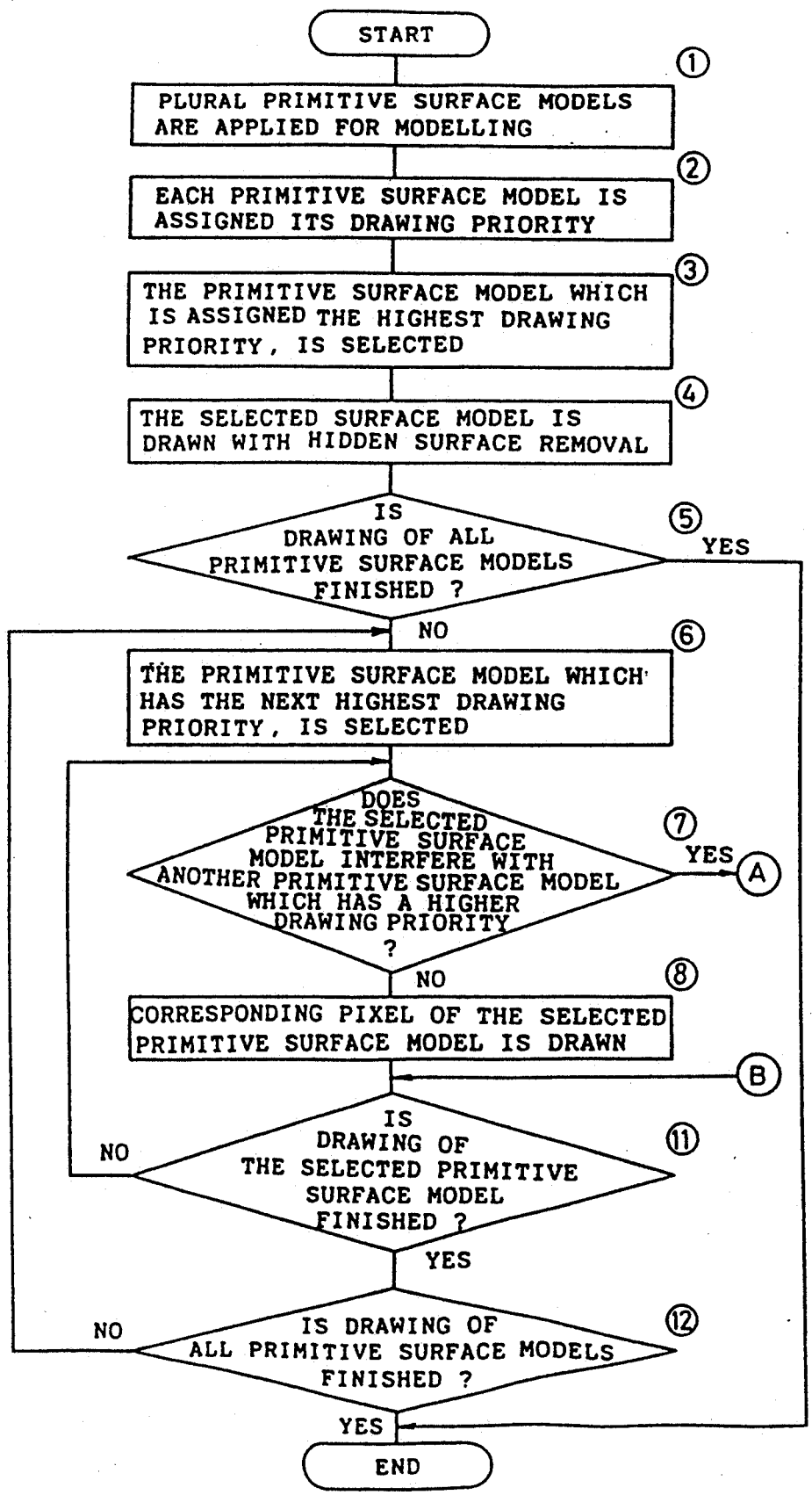

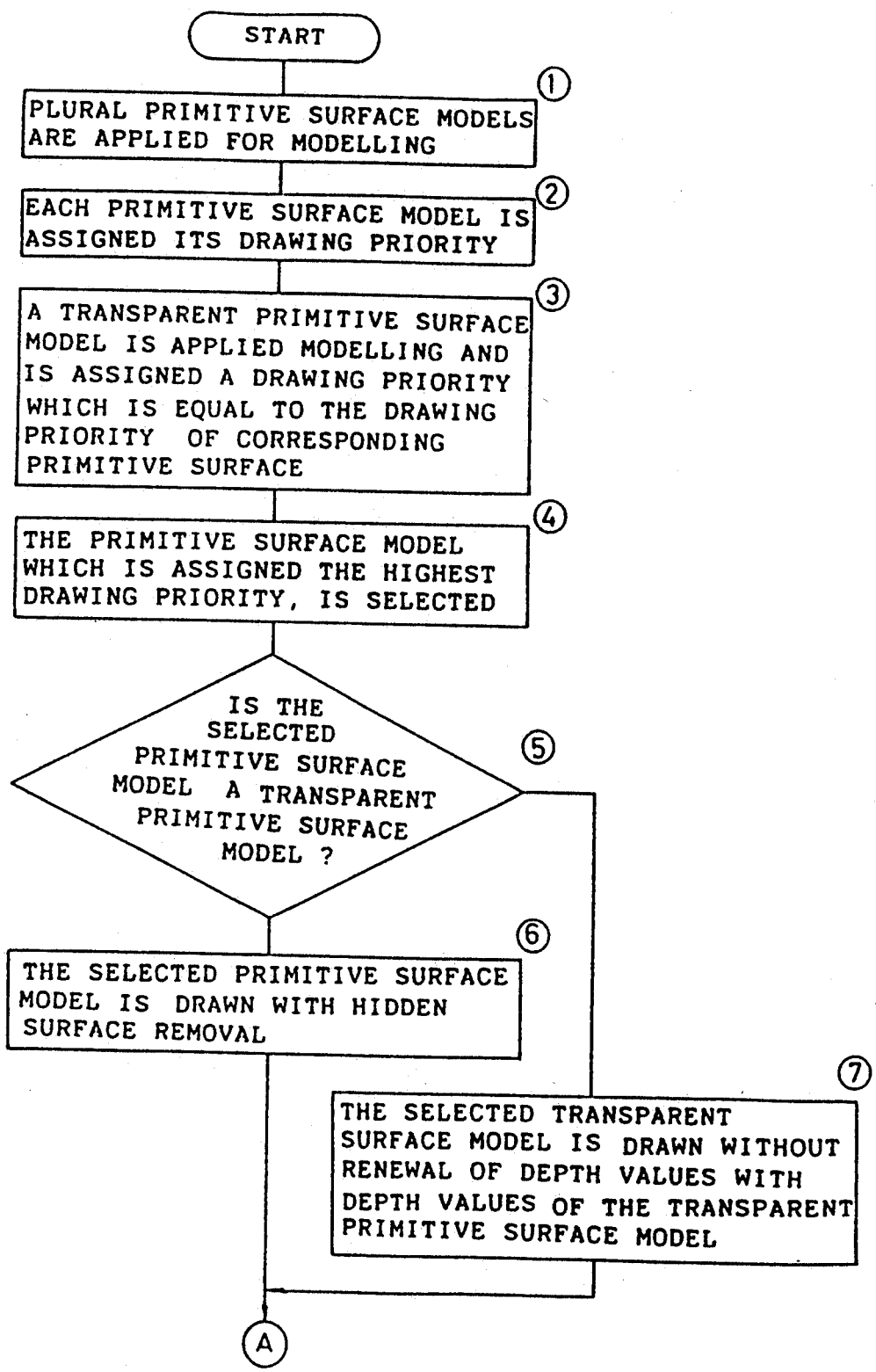

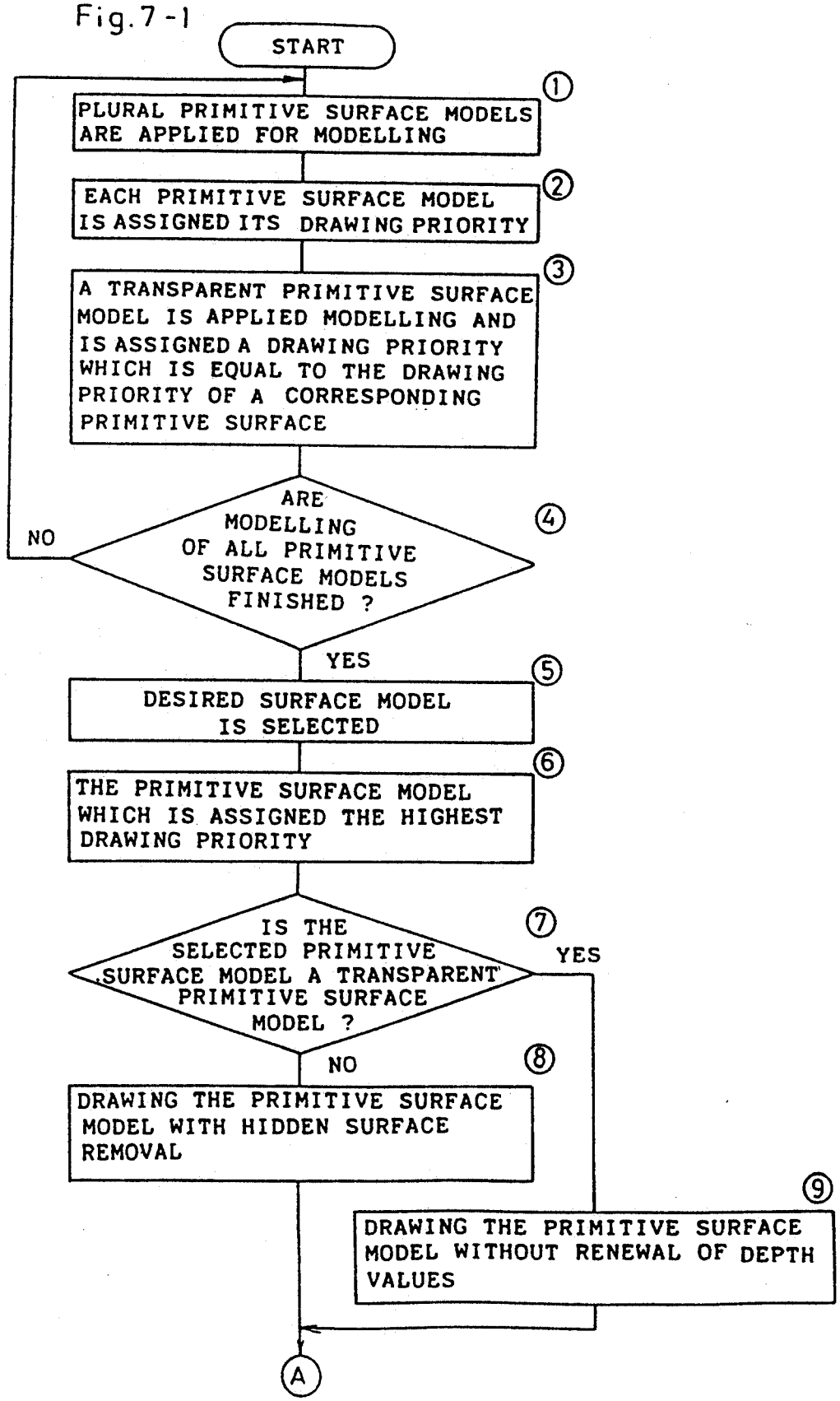

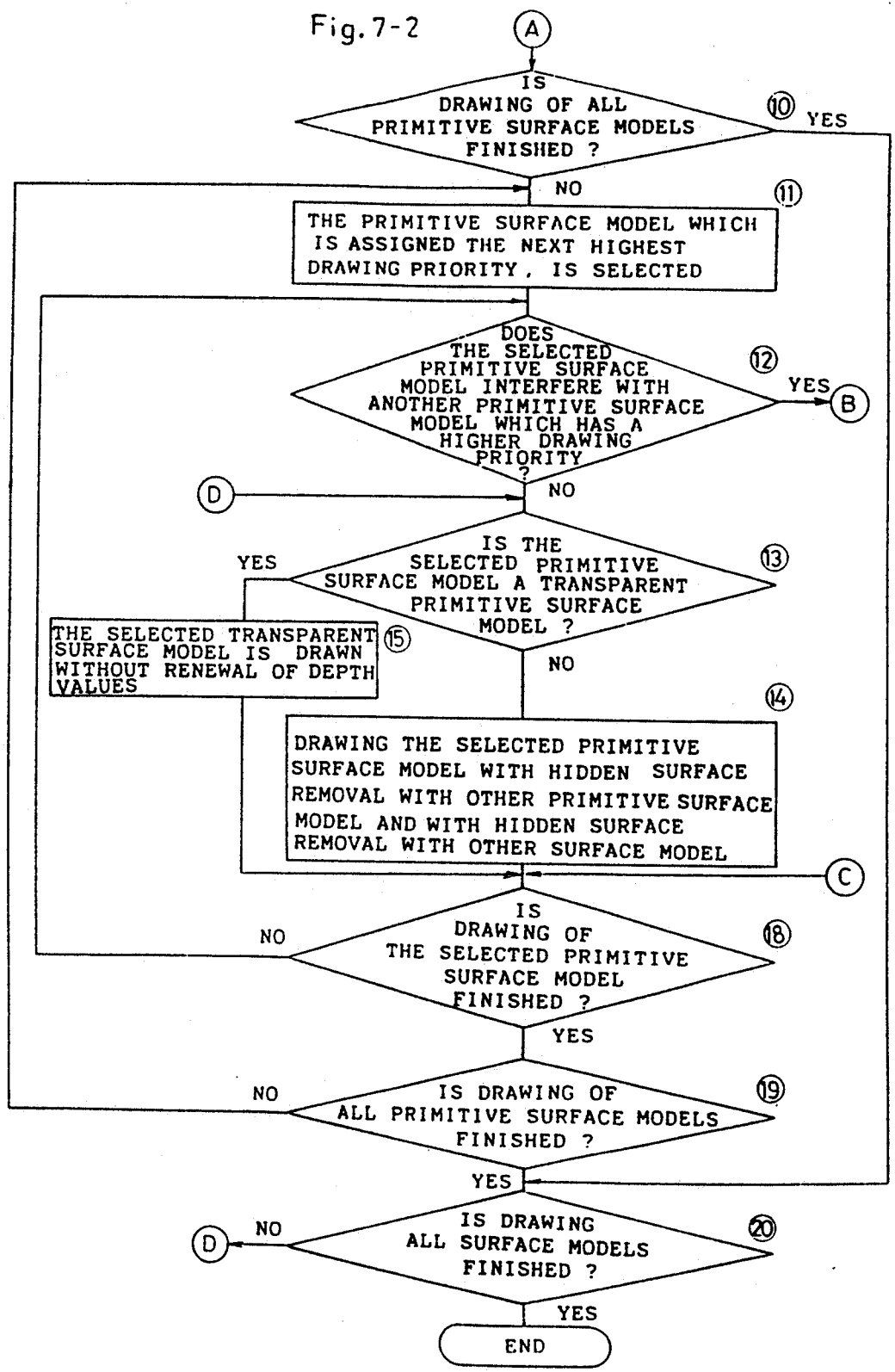

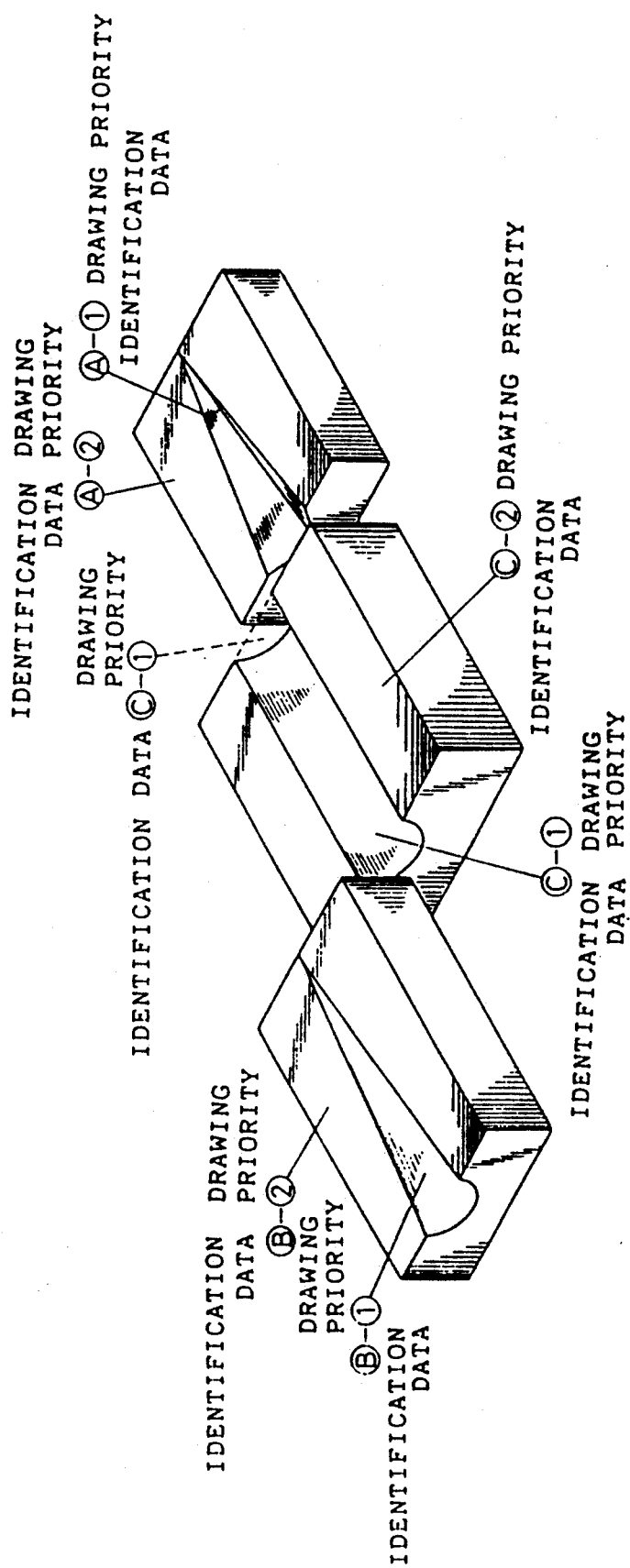

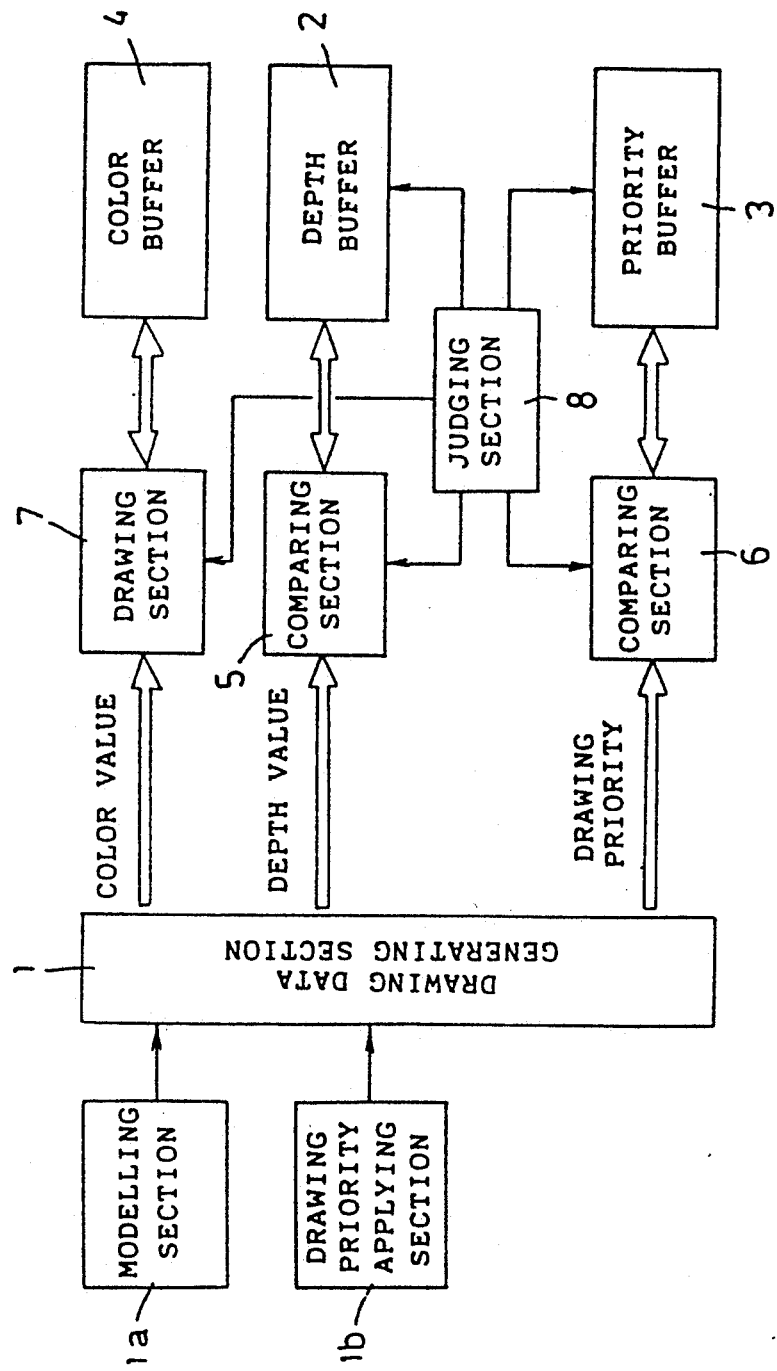

METHOD AND APPARATUS FOR DRAWING A SURFACE MODEL BY ASSIGNING A DRAWING PRIORITY TO EACH PRIMITIVE SURFACE MODEL WHICH PROVIDES A PORTION OF THE SURFACE MODEL

BACKGROUND OF THE INVENTION

The present invention relates to methods and apparatus for drawing a surface model, and more particularly to methods and apparatus for drawing a surface model through modelling of a target object.

In the field of computer aided design using computer graphics, it is required that a surface model be drawn three dimensionally so as to display the appearance of a target object. The surface model is a model which is formed with polygons as two dimensional elements and/or curved planes as three dimensional elements. The surface model does not have information indicative of which side thereof is inside of the target object. Taking that fact into consideration, the target object is displayed three dimensionally by generating not only plane coordinate values but also plane depth values to be displayed on a pixel basis, and by applying hidden surface removal based on the depth values.

Ordinarily, a surface model has a fairly complicated form and includes plural curved lines and curved planes. To explain concretely, when the surface model illustrated in FIG. 13-A is to be drawn, first modelling to the target object is performed as a combination of plural convex polygons as illustrated with broken lines in FIG. 13-A, second the surface model is drawn by performing hidden surface removal for each convex polygon. The surface model is accordingly drawn with realistically after the modelling is performed. But the disadvantage of remarkably lengthening the time period necessary for modelling, arises because of a remarkable increase of the number of convex polygons. In the application of computer aided design, the primitive shape of the target object is previously determined, and it is strongly demanded that the design effect be checked through changing only a partial face shape. When the conventional method is employed to satisfy the demand, modelling to the entire target object is needed even when only a partial face shape thereof is changed as illustrated in FIGS. 13-A and 13-B. Operability of modelling is remarkably lowered, accordingly.

Also, it is strongly demanded that characters, figures and the like be displayed on the outer face of the target object. When a method for defining characters, figures and the like as polygons having depth values, and for displaying the characters, figures and the like with hidden surface removal, is employed to satisfy the demand, the disadvantage arises that the characters, figures and the like are not displayed partially when depth values of the characters, figures and the like are slightly different from the depth values of the surface of the target object. To overcome the disadvantage, it is necessary to employ a method which first writes characters, figures and the like to be displayed into a mapping memory, second map the characters, figures and the like on a surface model using a texture mapping method. When a texture mapping method is employed, the disadvantage arises wherein the necessary operations become complex, because reading addresses from the mapping memory should be re-established even when only the locations of the characters, figures and the like to be displayed on the target object, are changed.

A method for simply drawing a target object having a complicated shape through performing a logical operation between primitives, a so called set operation or Boolean operation, is known as a method for drawing a solid model. For example, a target object illustrated in FIG. 14-C is obtained through a union operation based on rectangular parallelepipedons as illustrated in FIGS. 14-A and 14-B. A target object illustrated in FIG. 14-D is obtained through a difference operation based on rectangular parallelepipedons as illustrated in FIGS. 14-A and 14-B. A target object illustrated in FIG. 14-E is obtained through an intersection operation based on rectangular parallelepipedons as illustrated in FIGS. 14-A and 14-B. However, the method cannot be applied to a surface model because a surface model has no information indicative of which side of a plane is inside of the target object.

SUMMARY OF THE INVENTION

It is an object of the present invention to remarkably simplify drawing of a surface model having a complicated shape.

It is another object of the present invention to simply deal with a partial change of a surface model.

This present invention first applies depth values on a pixel basis and a drawing priority to primitive surface models. Each primitive surface model is a part of a surface model, and is composed of one or more plane components to form a primitive shape. Thereafter, the invention draws each primitive surface model by taking the depth values and drawing priorities into consideration.

According to this method, it is sufficient that modelling is applied only to each primitive surface model, thereby modelling can be simplified over modelling applied to a surface model as a whole. It is also sufficient that modelling is applied only to a changed primitive surface model when the surface model is partially changed. As a result, a surface model having arbitrary shape is drawn simply.

It is preferred that an interfering portion of a first primitive surface model to be drawn with a second primitive surface model which has been assigned the same drawing priority as the first primitive surface model, be drawn using hidden surface removal based on the depth values. Also, an interfering portion of the first primitive surface model to be drawn with a second primitive surface model which has been assigned a different drawing priority from the drawing priority of the first primitive surface model, is drawn without hidden surface removal when the first primitive surface model has a higher drawing priority. On the contrary, an interfering portion of the first primitive surface model to be drawn with a second primitive surface model which has been assigned a different drawing priority from the drawing priority of the first primitive surface model, is not drawn at all when the first primitive surface model has a lower drawing priority.

As a result, drawing a surface model which is similar to a set operation for a solid model, is performed.

It is also preferred that the invention further applies information to the primitive surface model on a pixel basis, the information being indicative of whether a front face or a rear face is to be drawn, and identifies the region of the primitive surface model. This region is indicated to draw the rear face of the primitive surface model. This region is drawn by taking only the depth values into consideration.

As a result, drawing a surface model realistically is performed.

It is further preferred that the invention draws a region of the surface model as a transparent region, the region being inhibited from being drawn. To be concrete, the invention defines additional primitive surface model having the same shape as the inhibited region drawing as a transparent plane, and draws the primitive surface model defined as a transparent plane, with inhibiting renewal of depth values with depth values of the translucent plane.

As a result, drawing a surface model is performed realistically with slight increase in the number of primitive surface model.

It is further preferred that the primitive surface model includes one or more characters.

Characters are displayed on the target object with high quality.

Another embodiment first assigns depth values on a pixel basis and a drawing priority to primitive surface models. Each primitive surface model is a part of each surface model, and is formed of one or more plane components, and has a primitive shape. Thereafter, the invention assigns identification information to each surface model for identifying each surface model. Then, the invention draws each primitive surface model which constitutes a surface model assigned particular identification information, based upon the depth values and drawing priorities. Further, the invention repeats the drawing processing for another surface model.

In this method, drawing surface models as a whole is performed realistically by drawing primitive surface models on a surface model basis based on the identification information. Also, modelling is simplified remarkably because modelling is required for primitive surface models of each surface model.

Another embodiment first assigns depth values on a pixel basis and a drawing priority to primitive surface models. Each primitive surface model is a part of a surface model, and is composed of one or more plane components, and has a primitive shape. Thereafter, the invention assigns information on a pixel basis to each surface model. The information is indicative of whether a front face or a rear face is to be drawn. Then, the embodiment defines a primitive surface model having the same shape as a region inhibited from being drawn as a transparent plane. Further, the invention identifies an interfering portion of one primitive surface model with another primitive surface model, identifies the relationship between the drawing priority of such one primitive surface model and the drawing priority of such another primitive surface model, identifies a rear face portion included in the interfering portion of one primitive surface model to be drawn, and identifies a primitive surface model which is defined as a transparent plane. Then, the invention draws the interfering portion of the primitive surface model to be drawn with another primitive surface model which has the same drawing priority as the drawing priority of the primitive surface model to be drawn, with hidden surface removal based on the depth values, draws the interfering portion of the primitive surface model to be drawn with another primitive surface model which has a lower drawing priority than the drawing priority of the primitive surface model to be drawn, without hidden surface removal, inhibits drawing the interfering portion of the primitive surface model to be drawn with another primitive surface model which has a higher drawing priority than the drawing priority of the primitive surface model to be drawn, draws a rear face portion of the primitive surface model to be drawn with hidden surface removal based on the depth values and without taking drawing priority into consideration, and draws the primitive surface model defined as a transparent plane without renewing depth values.

In this method, drawing surface models as a whole is performed realistically.

Another embodiment first assigns depth values on a pixel basis and a drawing priority to primitive surface models. Each primitive surface model is a part of each surface model, and is composed of one or more plane components, and has a primitive shape. Thereafter, the invention applies information on a pixel basis to each surface model. The information is indicative of whether a front face or a rear face is to be drawn. Then, the invention defines a primitive surface model having the same shape as a region inhibited from being drawn as a transparent plane. Further, the invention assigns identification information to each surface model for identifying each surface model. Thereafter, the invention selects one surface model which is assigned predetermined identification information. Then, the invention identifies an interfering portion of one primitive surface model with another primitive surface model, both primitive surface models being part of the selected surface model, identifies the relationship between the drawing priority of such one primitive surface model and the drawing priority of such another primitive surface model, identifies a rear face portion included in the interfering portion of the primitive surface model to be drawn, the primitive surface model being part of the selected surface model, and identifies a primitive surface model which is defined as a transparent plane, the primitive surface model being part of the selected surface model. Further, the invention draws the interfering portion of the primitive surface model to be drawn with another primitive surface model which has the same drawing priority as the drawing priority of the primitive surface model to be drawn, with hidden surface removal based on the depth values, draws the interfering portion of the primitive surface model to be drawn with another primitive surface model which has a lower drawing priority than the drawing priority of the primitive surface model to be drawn, without hidden surface removal, inhibits drawing of the interfering portion of the primitive surface model to be drawn with another primitive surface model which has a higher drawing priority than the drawing priority of the primitive surface model to be drawn, draws a rear face portion of the primitive surface model to be drawn with hidden surface removal based on the depth values and without taking the drawing priority into consideration, and draws the primitive surface model defined as a transparent plane without renewing depth values. Thereafter, the invention repeats the processing for another surface model.

In this method, drawing surface models as a whole is performed realistically through drawing primitive surface models on a surface model basis, based on the identification information. Also, modelling is simplified remarkably because modelling is required for primitive surface models of each surface model.

An apparatus according to the present invention comprises;

depth value calculating means for calculating depth values of a primitive surface model on a pixel basis, the primitive surface model being a part of the surface model, being formed of one or more plane components, and having a primitive shape;

drawing priority applying means for assigning a drawing priority to the primitive surface model;

depth value storing means for storing a depth value which is determined based on drawn primitive surface models;

drawing priority storing means for storing a drawing priority on a pixel basis based on the drawn primitive surface models;

first drawing controlling means which compares the calculated depth value with a stored depth value and the assigned drawing priority with a stored drawing priority, and generates a drawing pemission signal permitting drawing based on the comparison results; and drawing means for drawing said primitive surface model based on said drawing permission signal, and for renewing the depth value stored in the depth value storing means and the drawing priority stored in the drawing priority storing means.

It is preferred that the first drawing controlling means including;

drawing priority comparing means for comparing the applied drawing priority and the stored drawing priority;

depth value comparing means for comparing the calculated depth value and the stored depth value when the applied drawing priority is equal to the stored drawing priority; and drawing permission signal generating means for generating a drawing permission signal without taking depth value into consideration when the applied drawing priority is higher than the stored drawing priority, for generating a drawing permission signal based on the depth value comparison result when the applied drawing priority is equal to the stored drawing priority, and for inhibiting generation of a drawing permission signal when the applied drawing priority is lower than the stored drawing priority.

It is also preferred that the present invention further comprises;

front-rear information applying means for applying information indicative of whether a front face of the primitive surface model or a rear face of the primitive surface model is to be drawn on a pixel basis rear face region identifying means for identifying a region which is indicated to be drawn as a rear face of the primitive surface model; and second drawing controlling means for controlling the drawing means to draw the region by taking only depth values into consideration.

It is further preferred that the present invention further comprises;

third drawing controlling means for controlling the drawing means to draw a region which is inhibited from being drawn as a transparent region.

It is also preferred that the third drawing controlling means includes;

transparent plane defining means for defining a primitive surface model having the same shape as the region, as a transparent plane; and fourth drawing controlling means for controlling the drawing means to draw the primitive surface model defined as a transparent plane by inhibiting renewal of stored depth values with depth values of the translucent plane.

Another embodiment according to the present invention comprises:

depth value calculating means for calculating depth values of a primitive surface model which is a part of the surface model on a pixel basis, the primitive surface model being composed of one or more plane components, and having a primitive shape;

drawing priority applying means for applying drawing priority to the primitive surface model;

identification information applying means for applying identification information to each surface model for identifying one surface model from another;

selection means for selecting one surface model which is assigned a predetermined identification information;

depth value storing means for storing a depth value which is determined based on drawn primitive surface models;

drawing priority storing means for storing drawing priority on a pixel basis which is determined based on the drawn primitive surface models;

first drawing controlling means which compares the calculated depth value with the stored depth value and the applied drawing priority with the stored drawing priority, and generates a drawing pemission signal for permitting drawing based on the comparison results;

drawing means for drawing the primitive surface model based on the drawing permission signal, and for renewing the depth value stored in the depth value storing means and the drawing priority stored in the drawing priority storing means and repetition control mean for repetitively operating the selection means to select another surface model which has been assigned another identification information.

These and other objectives, features and advantages of the present invention will be more readily understood upon consideration of the present invention, taken in conjunction with the accompanying drawings

BRIEF DESCRIPTION OF THE DRAWINGS

FIG. 1 is a flowchart for a method for drawing a surface model according to a first embodiment of the present invention;

FIG. 8 is a diagram useful in understanding a method for drawing a surface model based on a concrete example;

FIG. 9 is a block diagram showing an apparatus for drawing a surface model according to the present invention;

DETAILED DESCRIPTION OF THE PREFERRED EMBODIMENTS

Figure 2A:
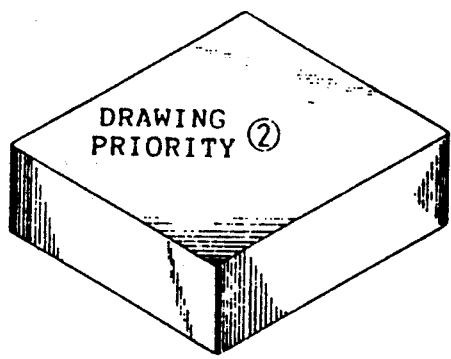
FIGS. 2-A to 2-E are diagrams useful in understanding a method for drawing a surface model based on a concrete example.
Figure 2B:
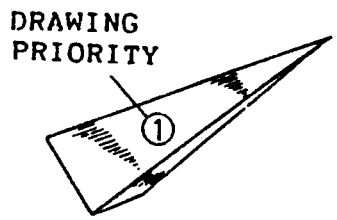
Figure 2C:
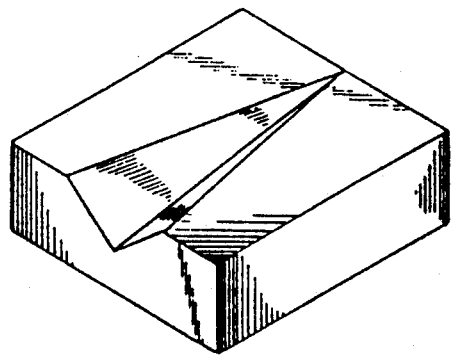
Figure 2D:
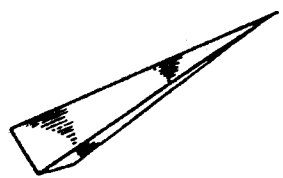
Figure 2E:
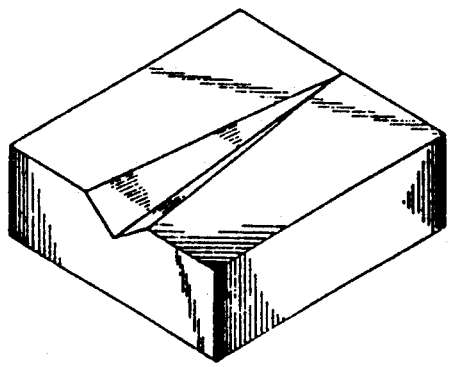

FIG. 1 is a flowchart for a method for drawing a surface model according to a first embodiment of the present invention.

In Step (1), plural primitive surface models are applied for modelling, respectively. Each primitive surface model is part of a desired surface model. In step (2), each primitive surface model is assigned its drawing priority based on the relative position of each primitive surface model. The drawing priority may be assigned to each primitive surface model based on the user's designation, or it may be automatically assigned to each primitive surface model by computer processing based on a construction order for each primitive surface model because the construction order of each primitive surface model is generally established. In step (3), the primitive surface model which is assigned the highest drawing priotity, is selected. In step (4), the selected surface model is drawn using hidden surface removal. In step (5), a judgement is made as to whether or not drawing of all primitive surface models are finished. When it is judged that there remains one or more primitive surface models which are not drawn, in step (6), the primitive surface model which has been assigned the next highest drawing priority, is selected. In step (7), a judgement is made on a pixel basis as to whether or not the selected primitive surface model interferes with another primitive surface model which is assigned a higher drawing priority. Only when it is judged in step (7) that the selected primitive surface model does not interfere with another primitive surface model is, in step (8), a corresponding pixel of the selected primitive surface model drawn. When it is judged in step (7) that the selected primitive surface model interferes with another primitive surface model, or when the operation of step (8) is performed, in step (9), it is judged whether or not drawing of the selected primitive surface model is finished. When it is judged in step (9) that drawing of the selected primitive surface model is not finished, the judgement in step (7) is repeated. On the other hand, when it is judged in step (9) that drawing of the selected primitive surface model is finished, in step (10), it is judged whether or not drawing of all primitive surface models is finished. When it is judged that there remains one or more primitive surface models which are not drawn, the selection operation in step (6) is repeated. On the other hand, when it is judged in step (5) or in step (10) that drawing all primitive surface model is finished, a series of operations are then finished.

Figures 2, 3:
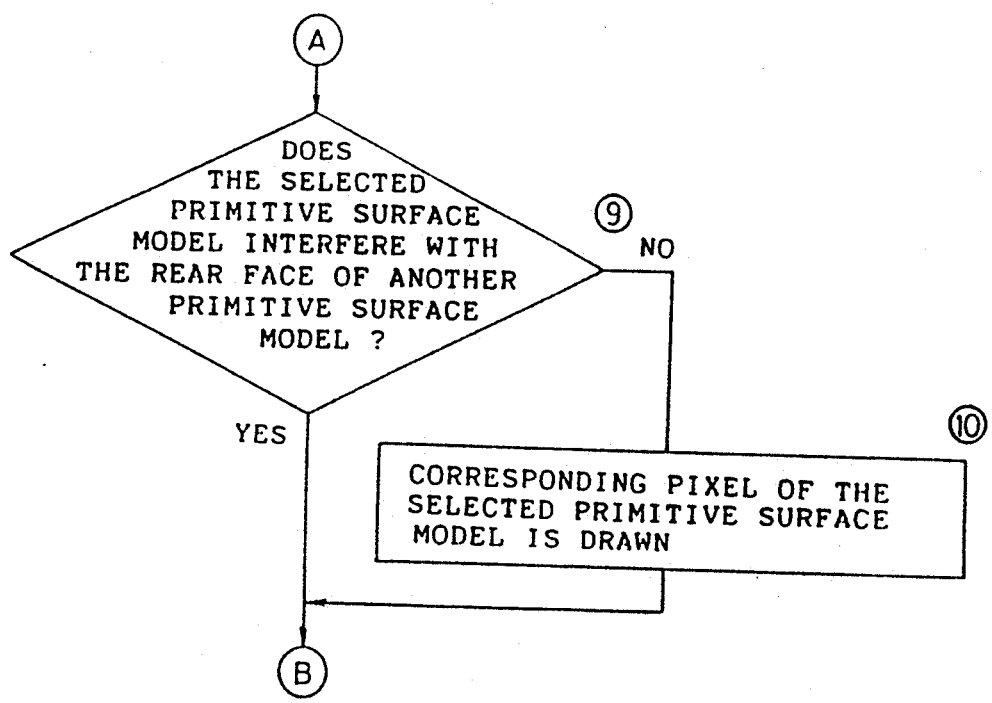
FIG. 3 is a flowchart for a method for drawing a surface model according to a second embodiment of the present invention.
Figure 4A:
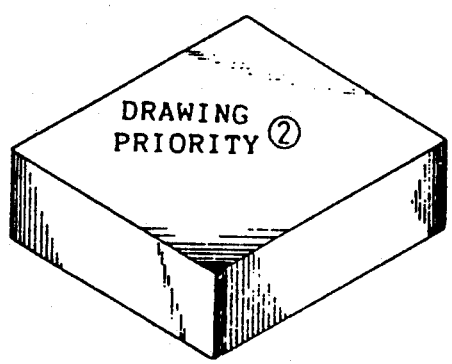
FIGS. 4-A to 4-E are diagrams useful in understanding a method for drawing a surface model based on a concrete example.
Figure 4B:
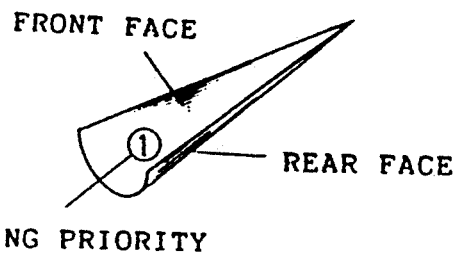
Figure 4C:
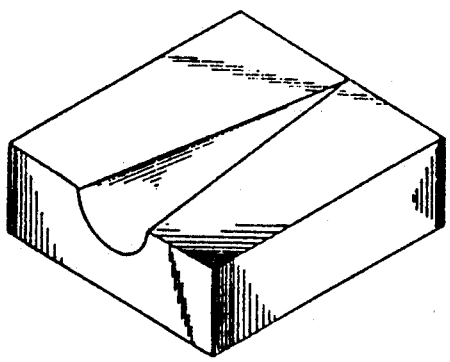
Figure 4D:
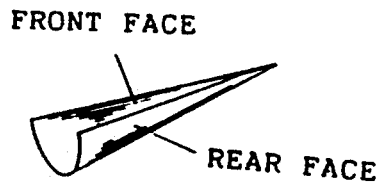
Figure 4E:
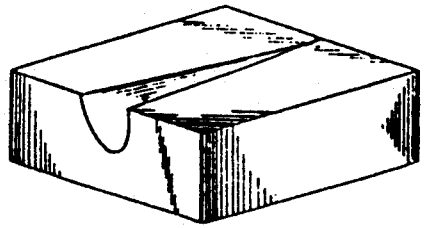

FIGS. 2-A to 2-E are diagrams useful in understanding a method for drawing a surface model based on a concrete example.

When a surface model illustrated in FIG. 2-C is drawn by combining a rectangular parallelepipedon as a primitive surface model illustrated in FIG. 2-A and a Tapered V-shaped groove as another primitive surface model illustrated in FIG. 2-B, it is sufficient that a higher drawing priority 1 is assigned to the primitive model of the tapered V-shaped groove, while a lower drawing priority 2 is assigned to the primitive surface model of the rectangular parallelepipedon, and that modelling is applied to each primitive surface model, respectively.

When the initial establishment as described earlier is obtained, first the tapered V-shaped groove is drawn, then the rectangular parallelepipedon is drawn. As to the interfering portion of the rectangular parallelepipedon with the tapered V-shaped groove, drawing priorities are taken into cosideration for preference in hidden surface removal. As a result, the surface model illustrated in FIG. 2-C is accordingly drawn because the interfering portion of the rectangular parallelepipedon is not actually drawn.

As is apparent from the foregoing, modelling is simplified remarkably over modelling of the surface model which is finally drawn, because modelling is required only for primitive surface models which are part of the surface model.

When the size of the surface model for a tapered V-shaped groove has been changed as illustrated in FIG. 2-E, it is sufficient that modelling of only the tapered V-shaped groove be performed and the drawing priority be assigned only to the tapered V-shaped groove illustrated in FIG. 2-D, because modelling of the rectangular parallelepipedon already has been performed. As a result, the surface model having a different size V-shaped groove is drawn easily.

Further, when a surface model having plural V-shaped grooves is to be drawn, it is sufficient that modelling of only one V-shaped groove be performed and that the location for drawing each V-shaped groove be designated. As a result, modelling is further simplified.

As is apparent from the foregoing, when characters, figures and the like are displayed on a target object, it is sufficient that characters, figures and the like are assigned a higher drawing priority than of a surface model representing the target object. Then, the characters, figures and the like are displayed on the surface model with high quality. Also, mapping a curved edge plane onto a surface model is performed easily. Changing the curved edge plane is also easily dealt with. Furthermore, changing a surface shape other than a curved edge plane, changing the qualitative feeling of a material, changing translucency and thé like, are easily dealt with.

SECOND EMBODIMENT

FIG. 3 is a flowchart for a method for drawing a surface model according to a second embodiment of the present invention.

In step (1), plural primitive surface models are applied for modelling, respectively. Each primitive surface model is part of a desired surface model. In step (2), only the front face of each primitive surface model is assigned a drawing priority based on the relative position of each primitive surface model. It is judged whether or not a face is the front face of the primitive surface model based on a normal vector which is supplied for drawing the primitive surface model. The drawing priority is accordingly assigned only to the front face of the primitive surface model based on the jugement result. Then, a front rear judgement flag is applied to the primitive surface model on a pixel basis based on the judgement result. In step (3), the primitive surface model which is assigned the highest drawing priotity, is selected. In step (4), the selected surface model is drawn using hidden surface removal. In step (5), a judgement is made whether or not drawing of all primitive surface models is finished. When it is judged that there remains one or more primitive surface models which are not drawn, in step (6), the primitive surface model which is applied the next highest drawing priotity, is selected. In step (7), a judgement is made on a pixel basis as to whether or not the selected primitive surface model interferes with another primitive surface model which has a higher drawing priority. Only when it is judged in step (7) that the selected primitive surface model does not interfere with another primitive surface model is, in step (8), a corresponding pixel of the selected primitive surface model drawn. When it is judged in step (7) that the selected primitive surface model interferes with another primitive surface model, or when the operation of step (8) is performed, in step (9), a judgement is made on a pixel basis as to whether the selected primitive surface model interferes with a front face or a rear face of another primitive surface which has a higher drawing priority. When it is judged in step (9) that the selected primitive surface model interferes with the rear face of another primitive surface model, in step (10), a corresponding pixel of the selected primitive surface model is drawn using hidden surface removal. When it is judged in step (9) that the selected primitive surface model interferes with the front face of another primitive surface model, or when the operation of step (8) or step (10) is performed, in step (11), it is judged whether or not drawing of the selected primitive surface model is finished. When it is judged in step (11) that drawing of the selected primitive surface model is not finished, the judgement in step (7) is repeated. On the other hand, when it is judged in step (11) that drawing of the selected primitive surface model is finished, in step (12), it is judged whether or not drawing of all primitive surface models is finished. When it is judged that there remains one or more primitive surface models which are not drawn, the selection operation in step (6) is repeated. On the other hand, when it is judged in step (5) or in step (12) that drawing all primitive surface models is finished, a series of operations are then finished.

FIGS. 4-A to 4-E are diagrams useful in understanding a method for drawing a surface model based on a concrete example.

When a surface model illustrated in FIG. 4-C is drawn by combining a rectangular parallelepipedon as a primitive surface model as illustrated in FIG. 4-A and a tapered U-shaped groove as another primitive surface model as illustrated in FIG. 4-B, it is sufficient that a higher drawing priority 1 be assigned to the primitive model of the tapered V-shaped groove, while a lower drawing priority 2 be assigned to the primitive surface model of the rectangular parallelepipedon, and that modelling is applied to each primitive surface model, respectively.

When the initial establishment as described earlier is obtained, first the tapered U-shaped groove is drawn, then the rectangular parallelepipedon is drawn. As to the interfering portion of the rectangular parallelepipedon with the tapered U-shaped groove, drawing priorities are taken into cosideration for preference in hidden surface removal. As a result, the surface model illustrated in FIG. 4-C is accordingly drawn because the interfering portion of the rectangular parallelepipedon is not actually drawn.

As is apparent from the foregoing, modelling is simplified remarkably over modelling of the surface model which is finally drawn, because modelling is required only for primitive surface models which are part of the surface model.

When the viewing direction to the surface model is changed as is illustrated in FIG. 4-E, the ratio of the front face to the rear face is changed. However, realistic drawing of the surface model as a whole is performed without extra processing because the drawing priority is taken into consideration only for the front face, while to the rear face is applied hidden surface removal.

THIRD EMBODIMENT

Figures 2, 5:
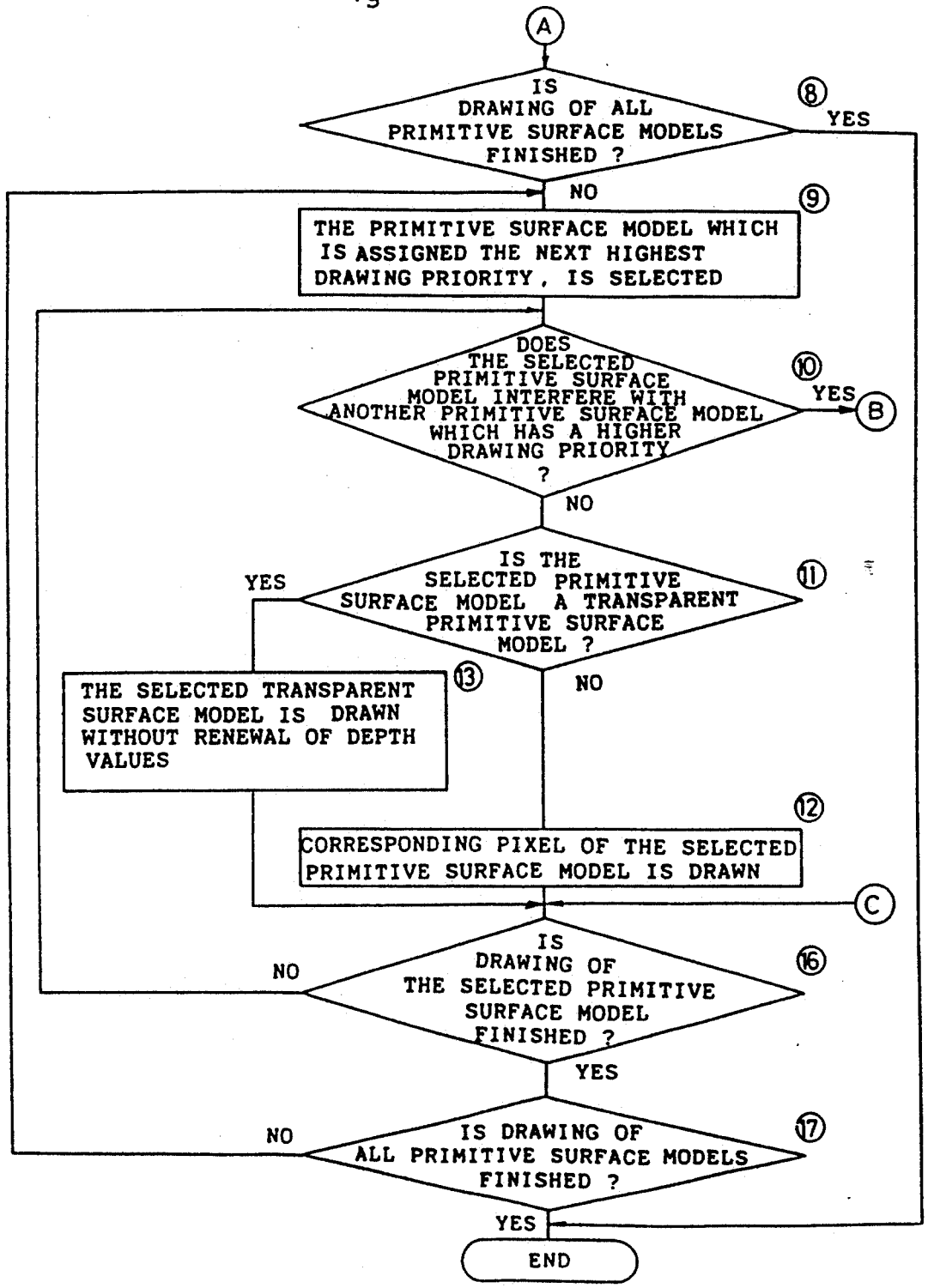
FIG. 5 is a flowchart for a method for drawing a surface model according to a third embodiment of the present invention.
Figures 3, 5:
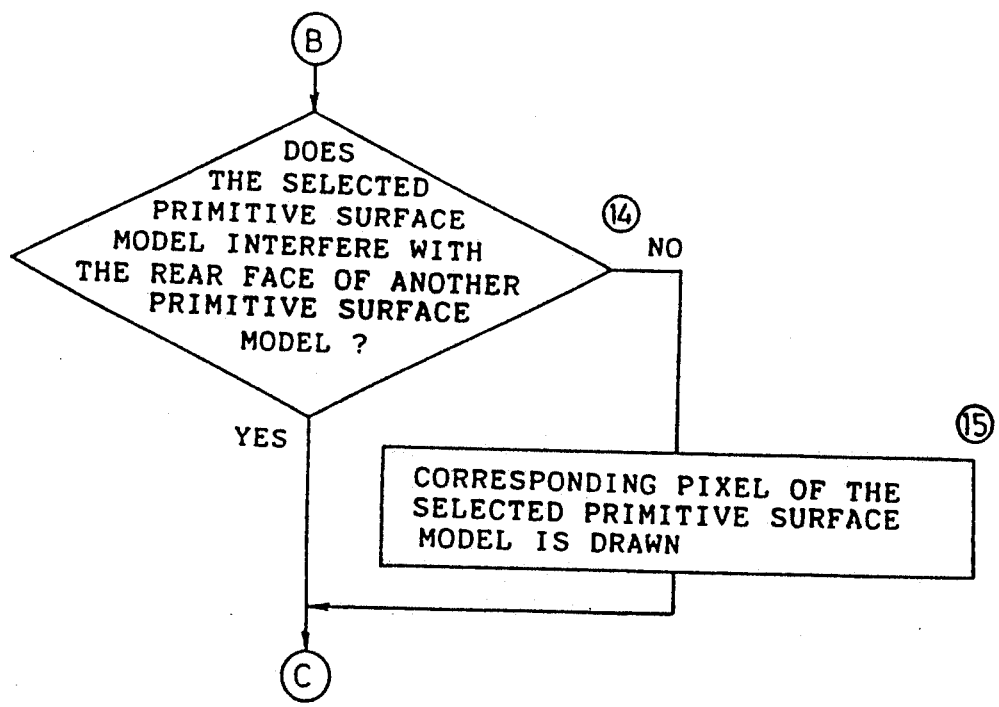
Figure 6A:
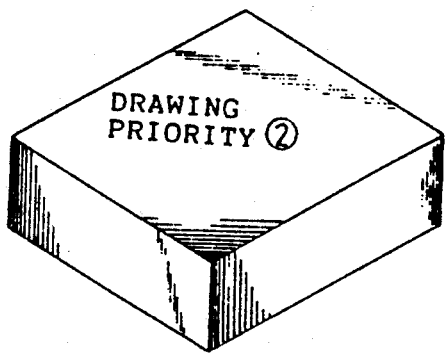
FIGS. 6-A to 6-D are diagrams useful in understanding a method for drawing a surface model based on a concrete example.
Figure 6B:
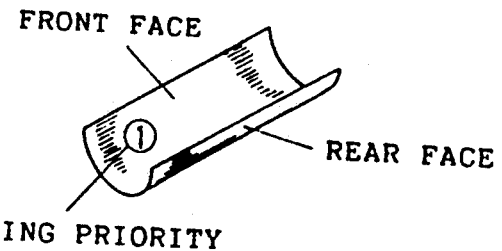
Figure 6C:
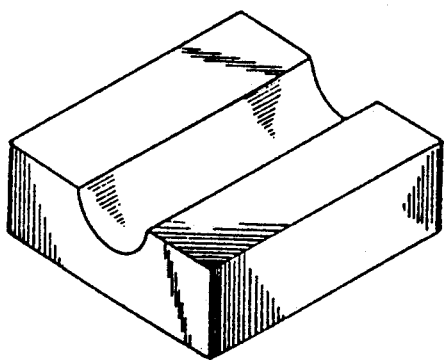
Figure 6D:
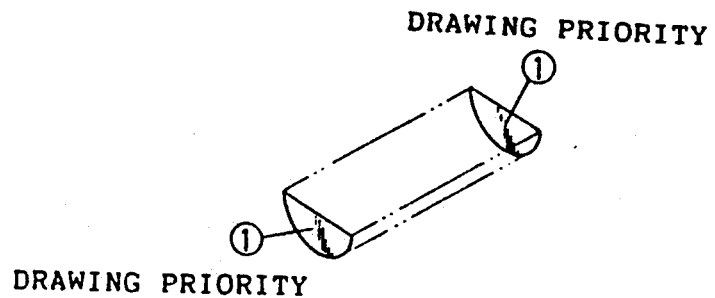

FIG. 5 is a flowchart for a method for drawing a surface model according to a third embodiment of the present invention.

In step (1), plural primitive surface models are applied for modelling, respectively. Each primitive surface model is a part of a desired surface model. In step (2), only the front face of each primitive surface model is assigned a drawing priority based on the relative position of each primitive surface model. In step (3), a transparent primitive surface model is applied for modelling. The transparent primitive surface model corresponds to a plane in which a primitive surface model having a lower drawing priority is reluctantly displayed. Also in step (3), the transparent primitive surface is assigned a drawing priority which is equal to the drawing priority of a corresponding primitive surface. In step (4), the primitive surface model which has the highest drawing priotity, is selected. In step (5), a judgement is made as to whether or not the selected primitive surface model is a transparent primitive surface model. When it is judged that the selected primitive surface model is not a transparent surface model, in step (6), the selected primitive surface model is drawn with hidden surface removal. On the other hand, when it is judged that the selected primitive surface model is a transparent surface model, in step (7), the selected transparent surface model is drawn without a renewal of depth values with depth values of the transparent primitive surface model. When processing in step (6) or step (7) is performed, in step (8), a judgement is made as to whether or not drawing of all primitive surface models is finished. When it is judged that there remains one or more primitive surface models which are not drawn, in step (9), the primitive surface model which has the next highest drawing priotity, is selected. In step (10), a judgement is made on a pixel basis as to whether or not the selected primitive surface model interferes with another primitive surface model which has a higher drawing priority. When it is judged in step (10) that the selected primitive surface model does not interfere with another primitive surface model, in step (11), a judgement is made as to whether or not the selected primitive surface model is a transparent primitive surface model. When it is judged that the selected primitive surface model is not a transparent surface model, in step (12), a corresponding pixel of the selected primitive surface model is drawn using hidden surface removal. On the other hand, when it is judged that the selected primitive surface model is a transparent surface model, in step (18), the selected transparent surface model is drawn without renewal of depth values with depth values of the transparent primitive surface model. When it is judged in step (10) that the selected primitive surface model interferes with another primitive surface model, in step (14), a judgement is made as to whether a front face or a rear face interferes with another primitive surface model. When it is judged that the rear face interferes with another primitive surface model, in step (15), a corresponding pixel of the selected primitive surface model is drawn using hidden surface removal. When it is judged in step (14) that a front face interferes with another primitive surface model or processing in steps (12), (13) or (15) is performed, in step (16), it is judged whether or not drawing of the selected primitive surface model is finished. When it is judged in step (16) that drawing of the selected primitive surface model is not finished, the judgement in step (10) is repeated. On the other hand, when it is judged in step (16) that drawing of the selected primitive surface model is finished, in step (17), it is judged whether or not drawing of all primitive surface models is finished. When it is judged that there remains one or more primitive surface models which are not drawn, the selection operation in step (9) is repeated. On the other hand, when it is judged in step (8) or in step (17) that drawing all primitive surface models is finished, a series of operations are then finished.

FIGS. 6-A to 6-D are diagrams useful in understanding a method for drawing a surface model based on a concrete example.

When a surface model illustrated in FIG. 6-C is drawn by combining a rectangular parallelepipedon as a primitive surface model as illustrated in FIG. 6-A and a U-shaped groove as another primitive surface model as illustrated in FIG. 6-B, it is sufficient that a higher drawing priority I be assigned to the primitive model o the U-shaped groove, while a lower drawing priority 2 be assigned to the primitive surface model of the rectangular parallelepipedon, and that a transparent primitive surface model corresponding to an edge plane of the U-shaped groove as illustrated in FIG. 6-D be assigned a higher drawing priority 1, and that modelling is applied for each primitive surface model, respectively.

When the initial establishment as described earlier is obtained first the U-shaped groove and the transparent plane are drawn, then the rectangular parallelepipedon is drawn. As to the interfering portions of the rectangular parallelepipedon with the U-shaped groove and the transparent, plane, drawing priorities are taken into consideration for preference in hidden surface removal. As a result, the surface model illustrated in FIG. 6-C is accordingly drawn because the interfering portions of the rectangular parallelepipedon with the front face of the U-shaped groove and with the transparent plane are not actually drawn, and because the interfering portion of the rectangular parallelepipedon with the rear face of the U-shaped groove is drawn with hidden surface removal. Furthermore, drawing another surface model which is seen through the transparent plane is not influenced by the transparent plane because renewal of depth values with depth values of the transparent plane is inhibited.

As is apparent from the foregoing, modelling is simplified remarkably over modelling of the surface model which is finally drawn, because modelling is required only for primitive surface models which are part of the surface model, and because a higher drawing priority is assigned only to the front face of the U-shaped groove.

Furthermore, drawing of the surface model is performed realistically without extra processing even when the viewing direction to the surface model is changed by 180 degrees because transparent planes are drawn on both sides of the U-shaped groove as illustrated in FIG. G-D.

FOURTH EMBODIMENT

Figures 3, 7:
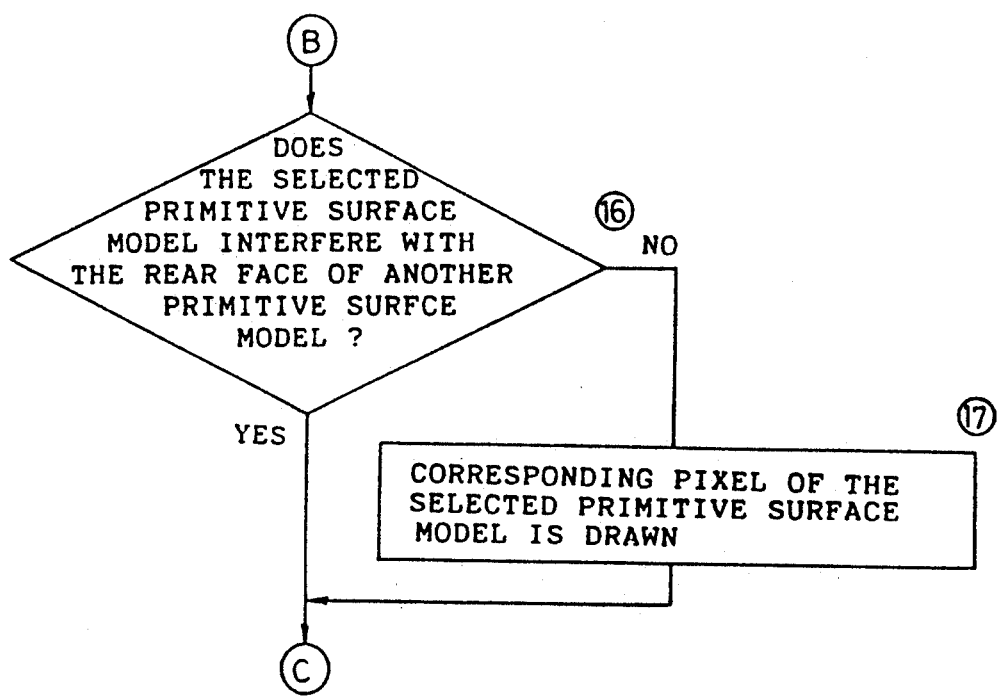
FIG. 7 is a flowchart for a method for drawing a surface model according to a fourth embodiment of the present invention.

FIG. 7 is a flowchart for a method for drawing a surface model according to a fourth embodiment of the present invention.

In step (1), plural primitive surface models are applied for modelling, respectively. Each primitive surface model is part of a desired surface model. In step (2), only the front face of each primitive surface model is assigned a drawing priority based on the relative position of each primitive surface model. Also, in step (2), each primitive surface model is assigned an identification data which is indicative of the effective extent of the drawing priority. The identification data indicate a surface model in which the primitive surface model belongs. In step (3), a transparent primitive surface model is applied for modelling. The transparent primitive surface model corresponds to a plane in which a primitive surface model having lower drawing priority within the effective extent is reluctantly displayed. Also in step (3), the transparent primitive surface is assigned a drawing priority which is equal to the drawing priority of the corresponding primitive surface. In step (4), a judgement is made as to whether or not modelling of all primitive surface models are finished. When it is judged that modelling of one or more primitive surface models are not finished, the processing in step (1) is repeated. On the other hand, when it is judged in step (4) that modelling of all primitive surface models are finished, in step (5), a desired surface model is selected. Then in step (6), the primitive surface model which has the highest drawing priority is selected. In step (7), a judgement is made as to whether or not the selected primitive surface model is a transparent primitive surface model. When it is judged that the selected primitive surface model is not a transparent surface model, in step (8), the selected primitive surface model is drawn along with other primitive surface models and with other surface models by using hidden surface removal. On the other hand, when it is judged that the selected primitive surface model is a transparent surface model, in step (9), the selected transparent surface model is drawn without renewal of depth values with depth values of the transparent primitive surface model. When processing in step (8) or step (9) is performed, in step (10), a judgement is made as to whether or not drawing of all primitive surface models is finished. When it is judged that there remains one or more primitive surface models which are not drawn, in step (11), the primitive surface model which has the next highest drawing priotity, is selected. In step (12), a judgement is made on a pixel basis as to whether or not the selected primitive surface model interferes with another primitive surface model which is assigned a higher drawing priority. When it is judged in step (12) that the selected primitive surface model does not interfere with another primitive surface model, in step (13), a judgement is made as to whether or not the selected primitive surface model is a transparent primitive surface model. When it is judged that the selected primitive surface model is not a transparent surface model, in step (14), a corresponding pixel of the selected primitive surface model is drawn with hidden surface removal along with other primitive surface models and other surface models. On the other hand, when it is judged that the selected primitive surface model is a transparent surface model, in step (15), the selected transparent surface model is drawn without renewal of depth values with depth values of the transparent primitive surface model. When it is judged in step (12) that the selected primitive surface model interferes with another primitive surface model, in step (16), a judgement is made as to whether a front face or a rear face interferes with another primitive surface model. When it is judged that the rear face interferes with another primitive surface model, in step (17), a corresponding pixel of the selected primitive surface model is drawn with hidden surface removal. When it is judged in step (16) that a front face interferes with another primitive surface model, or processing in steps (14), (15) or (17) is performed, in step (18), it is judged whether or not drawing of the selected primitive surface model is finished. When it is judged in step (18) that drawing of the selected primitive surface model is not finished. The judgement in step (12) is repeated. On the other hand, when it is judged in step (18) that drawing of the selected primitive surface model is finished, in step (19), it is judged whether or not drawing of all primitive surface models is finished. When it is judged that there remains one or more primitive surface models which are not drawn, the selection operation in step (11) is repeated. On the other hand, when it is judged in step (10) or in step (19) that drawing of all primitive surface models is finished, in step (20), a judgement is made as to whether or not drawing of all surface models is finished. When it is judged that there remains one or more surface models which are not drawn, processing in step (13) is repeated. On the other hand, when it is judged in step (20) that drawing of all surface models is finished, a series of operations are then finished.

FIG. 8 is a diagram useful in understanding a method for drawing a surface model based on a concrete example. The figure shows surface models, which are illustrated in FIGS. 2, 4 and 6, respectively.

In the concrete example, modelling of each surface model is the same as the corresponding concrete example, while application of the drawing priority is different from the concrete examples. More particularly, each primitive surface model is assigned identification data indicative of a surface model in which the primitive surface model belongs, and each primitive model also is assigned a drawing priority within its surface model.

Drawing of plural surface models is performed realistically even when surface models overlap one another by first judging whether the drawing priority has been taken into cosideration or hidden surface removal has been performed based on a judgement result indicative of whether Or not the identification data are identical to one the Other, and then drawing the surface model based on the judgement result and drawing the transparent plane without renewal of depth values.

FIRST APPARATUS EMBODIMENT

FIG. 9 is a block diagram showing an embodiment of an apparatus for drawing a surface model according to the present invention.

The apparatus includes a modelling section 1a, a drawing priority applying section 1b, a drawing data generating section 1, a depth buffer 2 as a depth value storing means, a priority buffer 3 as a drawing priority storing means, a color buffer 4, a comparing section 5 for the depth buffer 2 to perform hidden surface removal, a comparing section 6 for the priority buffer 3 to compare drawing priorities for preference with respect to depth values, a drawing section 7 for the color buffer 4, and a judging section 8 as a first drawing controlling means to output drawing enable signal.

The modelling section 1a performs modelling for each primitive surface model. The drawing priority applying section 1b assignes a drawing priority to each primitive surface model. The drawing data generating section 1 generates color values, depth values and drawing priorities on a pixel basis. The depth buffer 2 stores depth values on a pixel basis. The priority buffer 3 stores drawing priority on a pixel basis. The color buffer 4 stores color values on a pixel basis. The comparing section 5 compares a depth value generated by the drawing data generating section 1 and a depth value read out from the depth buffer 2 and provides a comparison result signal. The comparing section 5 also selects the depth value which is to be written into the depth buffer 2 again. The comparing section 6 compares the drawing priority generated by the drawing data generating section 1 and the drawing priority read out from the priority buffer 3 and provides a comparison result signal. The comparing section 6 also selects the drawing priority which is to be written into the priority buffer 3 again. The judging section 8 receives the comparison result signals supplied from the comparing sections 5 and 6, and provides a drawing enable signal. When the drawing enable signal is supplied to the drawing section 7, writing of the color value generated by the drawing data generating section 1 into the color buffer 4 or writing of the color value read out from the color buffer 4 into the color buffer 4 again, is selected by the drawing section 7.

The operation of the apparatus having the arrangement described above is as follows.

First, modelling for each primitive surface model is performed by the modelling section 1a, and each primitive surface model is assigned its drawing priority by the drawing priority applying section 1b. Each primitive surface model is part of a desired surface model. Then, the color value, depth value and the drawing priority are supplied from the drawing data generating section 1. The comparing section 6 compares the supplied drawing priority with the drawing priority read out from the priority buffer 3, and generates the comparison result signal indicative whether or not hidden surface removal is to be performed. The comparing section 5 compares the supplied depth value with the depth value read out from the depth buffer 2 to perform hidden surface removal, and provides the comparison result indicative of whether or not the color value is displayed. Both comparison results are supplied to the judging section 8 The judging section 8 provides the drawing enable signal despite the comparison result of depth values when the drawing priority supplied from the drawing data generating section 1 is higher than the drawing priority read out from the priority buffer 3. The judging section 8 outputs the drawing disable signal despite the comparison result for the depth values, when the drawing priority supplied from the drawing data generating section 1 is lower than the drawing priority read out from the priority buffer 3. The judging section 8 outputs the drawing enable signal or drawing disable signal based on the comparison result for depth values when the drawing priority supplied from the drawing data generating section 1 is equal to the drawing priority read out from the priority buffer 3. When the drawing enable signal is supplied to the drawing section 7, the color value supplied from the drawing data generating section 1 is Written into the color buffer 4. On the other hand, when the drawing disable signal is supplied to the drawing section 7, the color value read out from the color buffer 4 is written into the color buffer 4 again.

As a result, a desired surface model formed of plural primitive surface models is drawn realistically by preforming modelling with each primitive surface model and applying drawing priority to each primitive surface model.

SECOND APPARATUS EMBODIMENT

Figure 10:
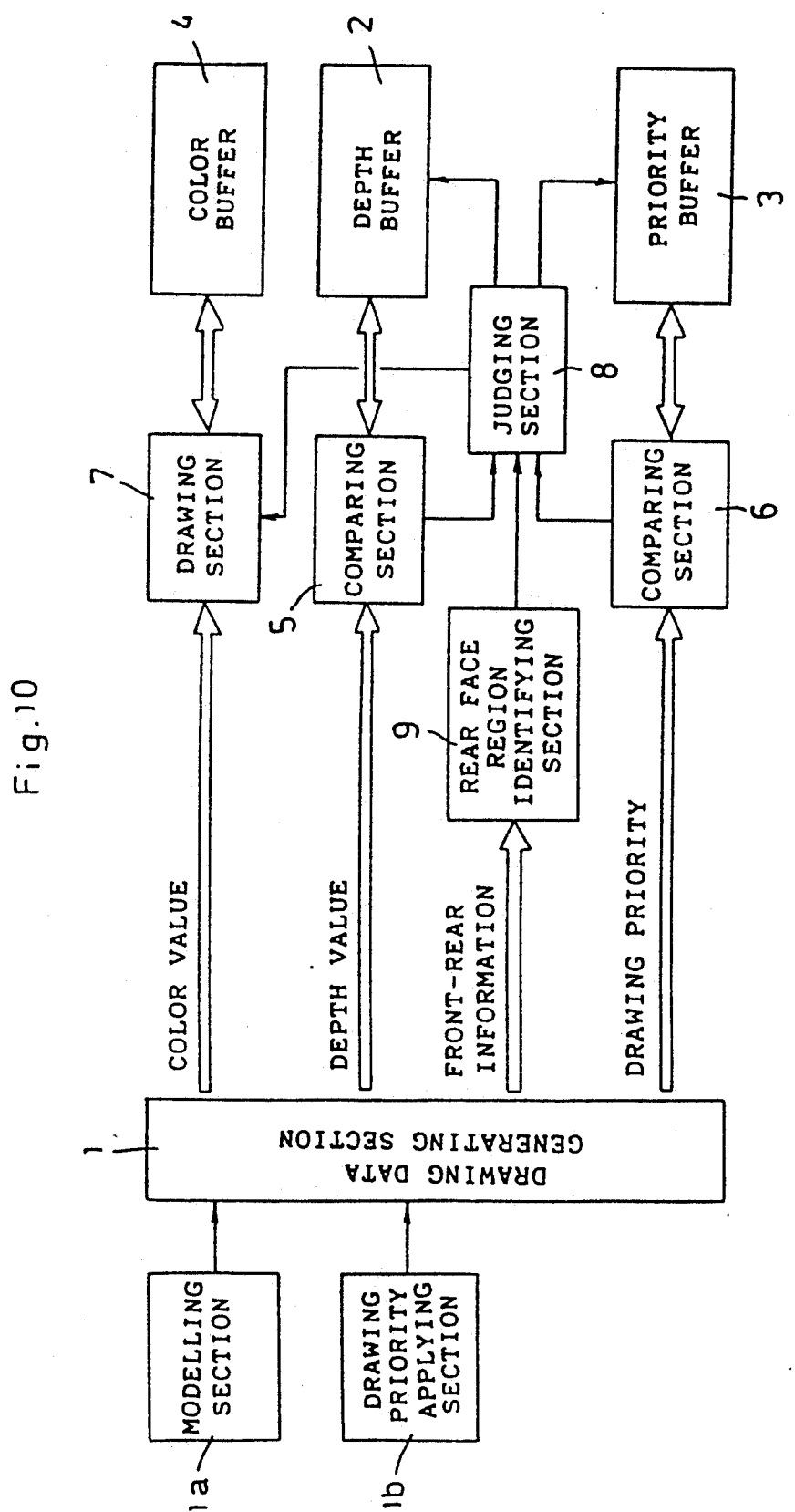
FIG. 10 is a block diagram showing another embodiment of an apparatus for drawing a surface model according to the present invention.

FIG. 10 is a block diagram showing another embodiment of an apparatus for drawing a surface model according to the present invention.

Differences from the previous embodiment are as follows, (1) the drawing data generating section 1 further outputs front-rear information indicative of whether a front face or a rear face is to be drawn, (2) a rear face region identifying section 9 is included. The rear face region identifying section 9 receives the front-rear information and identifies whether it is indicated that the rear face be drawn. The rear face region identifying section 9 supplies a control signal causing ignoring of the drawing priorities comparison result, to the judging section 8.

The operation of the apparatus having the arrangement described above is as follows.

When the front face of the primitive surface model is to be drawn, drawing of the surface model in a manner similar to the previous embodiment is performed. On the other hand, when the rear face of the primitive surface model is to be drawn, drawing of the primitive surface model is performed with hidden surface removal and without taking the drawing priority into consideration. As a result, the surface model is drawn realistically as is illustrated in FIG. 4.

THIRD APPARATUS EMBODIMENT

Figure 11:
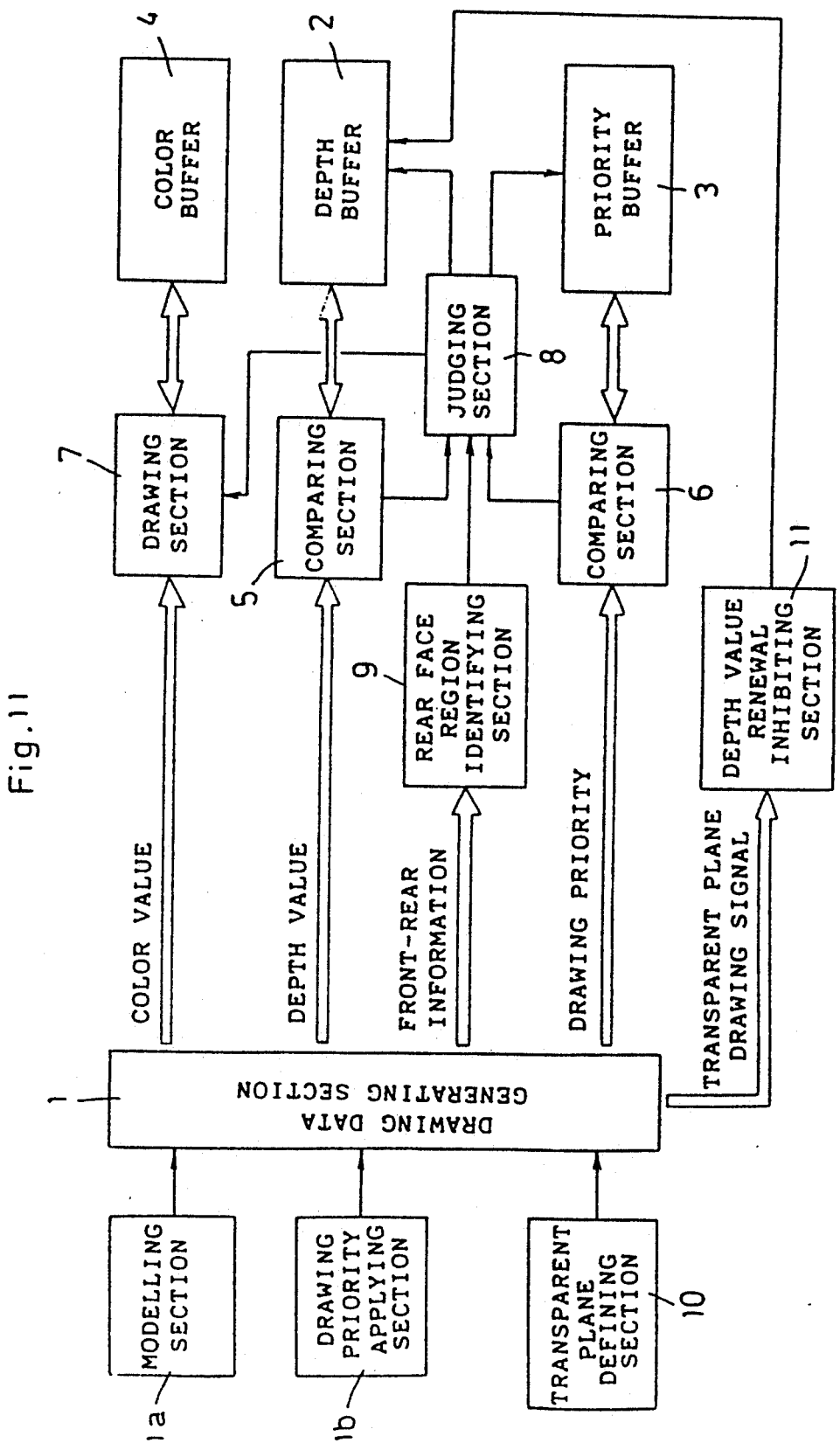
FIG. 11 is a block diagram showing still another embodiment of an apparatus for drawing a surface model according to the present invention.

FIG. 11 is a block diagram showing another embodiment of an apparatus for drawing a surface model according to the present invention.

Differences from the second apparatus embodiment are as follows, (1) a transparent plane defining section 10 is included. The transparent plane defining section 10 supplies an indicating signal to the drawing data generating section 1. The indicating signal indicates the presence of a primitive surface model having the same shape as a drawing inhibit region, as a transparent plane.

(2) a depth value renewal inhibiting section 11 is also included. The depth value renewal inhibiting section 11 receives a transparent plane drawing signal outputted from the drawing data generating section 1 and outputs a writing disable signal to the depth buffer 2.

The operation of the apparatus having the arrangement described above is as follows.

When the surface model has no region which is to be inhibited from being drawn, drawing of the surface model similar to the second apparatus embodiment is performed. On the other hand, when the surface model has one or more regions for which drawing is to be inhibited (drawing inhibit region), it is sufficient that an indicating signal, indicative of a primitive surface model having the same shape as a drawing inhibit region, be supplied to the drawing data generating section 1. The depth value renewal inhibiting section 11 outputs a writing disable signal to the depth buffer 2 when the transparent plane is to be drawn. Then the primitive surface model as a transparent plane is drawn without renewal of the depth values. As a result, drawing of the surface model is realistically performed as is illustrated in FIG. 6.

FOURTH APPARATUS EMBODIMENT

Figure 12:
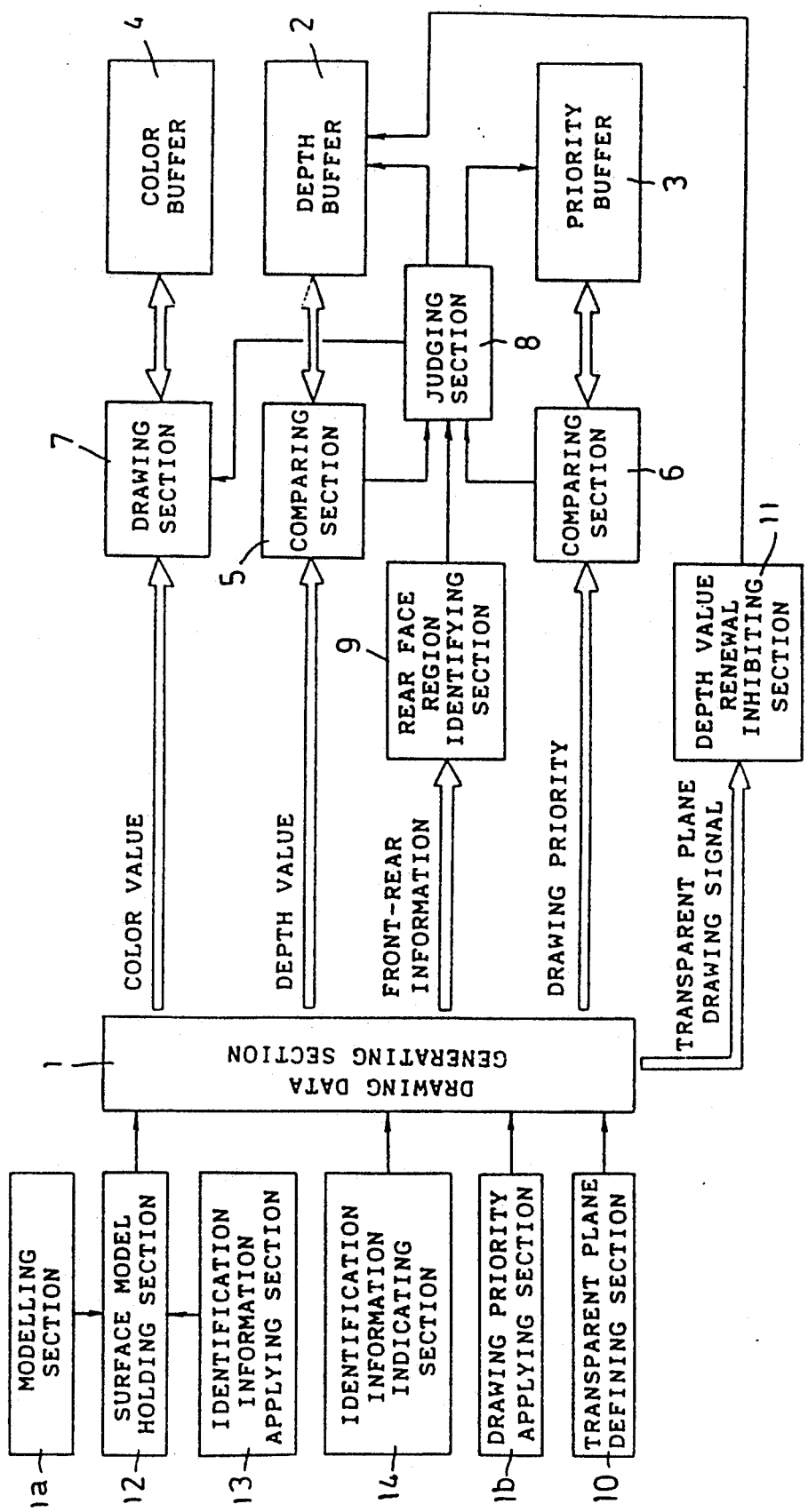
FIG. 12 is a block diagram showing yet another embodiment of an apparatus for drawing a surface model according to the present invention.
Figure 13A:
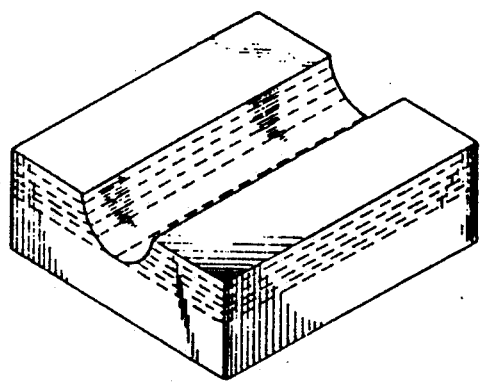
FIGS. 13-A and 13-B are perspective views illustrating a conventional method for drawing a surface model.
Figure 13B:
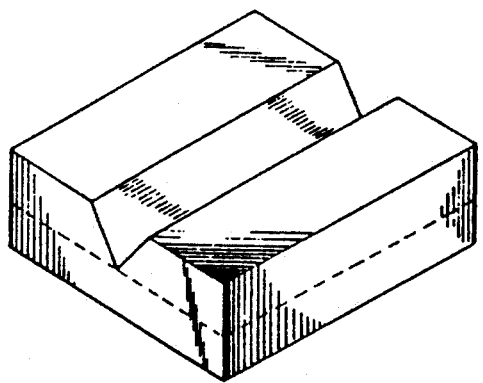
Figure 14A:
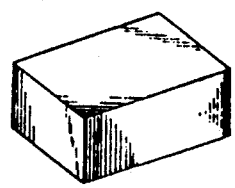
FIGS. 14-A to 14-E are perspective views illustrating a set operation for a solid model.
Figure 14B:
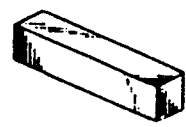
Figure 14C:
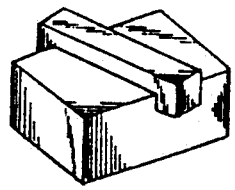
Figure 14D:
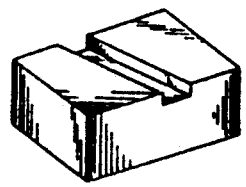
Figure 14E:

FIG. 12 is a block diagram showing still another embodiment of an apparatus for drawing a surface model according to the present invention.

Differences from the third apparatus embodiment are as follows, (1) a surface model holding section 12 for holding plural surface models for which are performed modelling is included, (2) an identification information applying section 13 for assigning identification information to each surface model is included. The identification information is used to identify surface models one from the other.

(3) identification information indicating section 14 for supplying identification information to the drawing data generating section 1 is included. The supplied identification information identifies a surface model to be read out from the surface model holding section 12. The identification information indicating section 14 supplies different identification information to the drawing data generating section 1 when drawing of the surface model to which identification information has been assigned, is finished.

The operation of the apparatus having the arrangement described above is as follows.

When plural surface models are to be drawn, drawing of each surface model, which is identified based on the identification information, is sequentially performed. As a result, drawing of the surface models is performed realistically as is illustrated in FIG. 8.

This invention is not limited to the foregoing embodiments. Preferably, drawing priorities may be cleared when drawing of each surface model formed of plural primitive surface models is finished, instead of applying drawing priority together with identification information. Preferably, modelling with a primitive surface model may be performed in which characters and a higher drawing priority are assigned to the primitive surface model, thereby characters are displayed on a object with high quality The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

What is claimed is:

1. A method for drawing a surface model by modelling a target object with plural plane components, said method comprising the steps of;
   (1) assigning depth values on a pixel basis and drawing priorities to primitive surface models which comprise a part of said surface model, said primitive surface model being formed of one or more of said plane components and having a primitive shape;
   (2) drawing each of said primitive surface models based upon said depth values and said drawing priorities; and
   (3) drawing a region of said surface model without renewal of color values and depth values and with renewal of drawing priorities, said region being inhibited from actually being drawn as a visible region.

2. A method as set forth in claim 1, wherein when one primitive surface model to be drawn has a portion that interferes with another primitive surface model and said another primitive surface model has a same drawing priority as said one primitive surface model, said one primitive surface model is drawn with hidden surface removal based on said depth values, and when said another primitive surface model has a different drawing priority from said one primitive surface model to be drawn, said one primitive surface model is drawn without hidden surface removal based on said depth values when said one primitive surface model has a higher drawing priority, and said interfering portion of said one primitive surface model to be drawn is not drawn when said one primitive surface model has a lower drawing priority.

3. A method as set forth in claim 1, further comprising the steps of;
   assigning information to said primitive surface model on a pixel basis, said information being indicative of whether a front face or a rear face is to be drawn;
   identifying a region of said primitive surface model, said region being indicated as the rear face of said primitive surface model; and
   drawing said region by taking only the depth values into consideration.

4. A method as set forth in claim 1, wherein said step (3) comprises the steps of;
   (3a) defining an additional primitive surface model, having a same shape as said inhibited region, as a plane for which drawing priority renewal is permitted and color value and depth value renewal are inhibited; and
   (3b) drawing said additional primitive surface model by inhibiting renewal of color values and depth values and by permitting renewal of drawing priorities, with hidden surface removal based on depth values of said plane.

5. A method as set forth in claim 1, wherein said primitive surface models include one or more models which express shapes of characters.

6. A method for drawing a surface model by modelling a target object with plural plane components, said method comprising the steps of;
   (1) assigning depth values on a pixel basis and drawing priorities to primitive surface models which comprise a part of said surface model, said primitive surface model being formed of one or more of said plane components and having a primitive shape;
   (2) assigning information on a pixel basis to said primitive surface model, said information being indicative of whether a front face or a rear face is to be drawn,
   (3) defining an additional primitive surface model, having a same shape as said inhibited region, as a plane for which drawing priority renewal is permitted and color value and depth value renewal are inhibited;
   (4) identifying an interfering portion of one primitive surface model that interferes with another primitive surface model;
   (5) identifying a relationship between the drawing priority of said one primitive surface model and the drawing priority of said another primitive surface model;
   (6) identifying a rear face portion included in said interfering portion of said primitive surface model to be drawn, based on said information indicative of whether a front face or a rear face is to be drawn;
   (7) identifying said additional primitive surface model; and
   (8) drawing said interfering portion of said one primitive surface model to be drawn with another primitive surface model with hidden surface removal based upon said depth values when said another primitive surface model is assigned the same drawing priority as the drawing priority of said one primitive surface model to be drawn, drawing said interfering portion of said one primitive surface model to be drawn with said another primitive surface model without hidden surface removal based on said dept values when said another primitive surface model is assigned a lower drawing priority than the drawing priority of said one primitive surface model to be drawn, inhibiting drawing of said interfering portion of said one primitive surface model to be drawn with said another primitive surface model when said another primitive surface model is assigned a higher drawing priority than the drawing priority of said one primitive surface model to be drawn, drawing said rear face portion of said one primitive surface model to be drawn with hidden surface removal based on said depth values and without taking drawing priority into consideration, or drawing said additional primitive surface model by inhibiting renewal of color values and depth values and by permitting renewal of drawing priorities with hidden surface removal based on said depth values of said plane.

7. A method for drawing plural surface models by modelling a target object with plural plane components, said method comprising the steps of:
   (1) assigning depth values on a pixel basis and drawing priorities to primitive surface models which comprise a part of each said surface model, each said primitive surface model being formed of one or more of said plane components and having a primitive shape;
   (2) assigning information on a pixel basis to each said surface model, said information being indicative of whether a front face or a rear face is to be drawn,
   (3) defining an additional primitive surface model, having a same shape as said inhibited region, as a plane for which drawing priority renewal is permitted and color value and depth value renewal are inhibited;

(4) assigning identification information to each said surface model for identifying each said surface model;

(5) selecting one surface model which has predetermined identification information;

(6) identifying an interfering portion of said one primitive surface model with another primitive surface model, both of said primitive surface models being part of said selected surface model;

(7) identifying a relationship between the drawing priority of said one primitive surface model and the drawing priority of said another primitive surface model;

(8) identifying a rear face portion included in said interfering portion of said one primitive surface model to be drawn, based on said information indicative of whether a front face or a rear face is to be drawn;

(9) identifying said additional primitive surface model;

(10) drawing said interfering portion of said one primitive surface model to be drawn with another primitive surface model to be drawn with another primitive surface model with hidden surface removal based on said depth values when said another primitive surface model is assigned the same drawing priority as the drawing priority of said one primitive surface model to be drawn, drawing said interfering portion of said one primitive surface model to be drawn with another primitive surface model without hidden surface removal based on said depth values when said another primitive surface model is assigned a lower drawing priority than the drawing priority of said one primitive surface model to be drawn, inhibiting drawing of said interfering portion of said one primitive surface model to be drawn with another primitive surface model when said another primitive surface model is assigned a higher drawing priority than the drawing priority of said one primitive surface model to be drawn, drawing said rear face portion of aid one primitive surface model to be drawn with hidden surface removal based on said depth values and without taking said drawing priority into consideration, or drawing said additional primitive surface model by inhibiting renewal of color values and depth values and by permitting renewal of drawing priorities with hidden surface removal based on said depth values of said plane; and

(11) repeating the processing form step (5) to step (10) for another surface model.

8. An apparatus for drawing a surface model by modelling a target object with plural plane components, said apparatus comprising;

depth value calculating means for calculating depth values of a primitive surface model on a pixel basis, said primitive surface model (a) being a part of said surface model, (b) being formed of one or more of said plane components, and (c) having a primitive shape;

drawing priority applying means for assigning a drawing priority to said primitive surface model;

depth value storing means for storing a depth value which is determined based on drawn primitive surface models;

drawing priority storing means for storing drawing priority on a pixel basis which is determined based on said drawn primitive surface models;

first drawing controlling means which compares said calculated depth value with a stored depth value and said assigned drawing priority with a stored drawing priority, and generates a drawing permission signal permitting drawing based on the comparison results;

second drawing controlling means for controlling said drawing means to draw a region by renewing only drawing priorities, said region being inhibited from actually being drawn as a visible region; and drawing means for drawing said primitive surface model based on said drawing permission signal, and for renewing said depth value stored in said depth value storing means and said drawing priority stored in said drawing priority storing means.

9. An apparatus as set forth in claim 8, wherein said first drawing controlling means includes;

drawing priority comparing means for comparing said applied drawing priority with said stored drawing priority;

depth value comparing means for comparing said calculated depth value wit said stored depth value when said assigned drawing priority is equal to said stored drawing priority; and drawing permission signal generating means for generating said drawing permission signal without taking depth values into consideration when said assigned drawing priority is higher than said stored drawing priority, for generating said drawing permission signal based on said comparison result of said depth values when said applied drawing priority is equal to said stored drawing priority, and for inhibiting generation of said drawing permission signal when said applied drawing priority is lower than said stored drawing priority.

10. An apparatus as set forth in claim 8, wherein said second drawing controlling means includes;

plane defining means for defining an additional primitive surface model having a same shape as said region; and wherein said apparatus includes third drawing controlling means for controlling said drawing means to draw said additional primitive surface model with hidden surface removal based on said depth values of a plane, with renewal of stored drawing priorities with drawing priorities of said plane permitted, with renewal of stored depth values with depth values of said plane inhibited and with renewal of color values of said plane inhibited, when said region is inhibited from actually being drawn as a visible region.

* * * * *